(12) United States Patent
Oka

(10) Patent No.: US 6,961,062 B2
(45) Date of Patent: Nov. 1, 2005

(54) IMAGE PROCESSING SYSTEM, IMAGE PROCESSING METHOD, COMPUTER PROGRAM, RECORDING MEDIUM, AND SEMICONDUCTOR DEVICE

(75) Inventor: Masaaki Oka, Kanagawa (JP)

(73) Assignee: Sony Computer Entertainment Inc., (JP)

( * ) Notice: Subject to any disclaimer, the term of this patent is extended or adjusted under 35 U.S.C. 154(b) by 373 days.

(21) Appl. No.: 10/263,033

(22) Filed: Oct. 2, 2002

(65) Prior Publication Data

US 2003/0125111 A1 Jul. 3, 2003

(30) Foreign Application Priority Data

Oct. 2, 2001 (JP) .............................. 2001-306881
Sep. 17, 2002 (JP) .............................. 2002-270146

(51) Int. Cl.[7] ............................................ G06T 15/00
(52) U.S. Cl. ...................................... 345/473; 715/788
(58) Field of Search ............................... 345/473, 474, 345/475, 440, 441, 443, 419, 619, 629, 630, 345/606, 618; 715/762, 788

(56) References Cited

U.S. PATENT DOCUMENTS 6,040,840 A    3/2000  Koshiba et al. ............. 345/441
6,483,499 B1 * 11/2002  Li et al. ...................... 345/179

FOREIGN PATENT DOCUMENTS

EP    0 842 682 A1    5/1998
EP    1 036 581 A2    9/2000

OTHER PUBLICATIONS

Du et al., Dynamic PDE Surfaces with Flexible and General Geometric Constraints, IEEE, the Eighth Pacific Conference, Oct. 2000, pp. 213-223.*
Reynolds, C.W., "Flocks, Herds, and Schools: A Distributed Behavioral Model", Computer Graphics-Siggraph '87 Conference Proceedings, vol. 21, No. 4, pp. 25-37, Jun. 1987.

* cited by examiner

*Primary Examiner*—Phu K. Nguyen
(74) *Attorney, Agent, or Firm*—Lerner, David, Littenberg, Krumholz & Mentlik, LLP

(57) ABSTRACT

At a site on a moving object image, one or more units, i.e., image components combinable with or separable from the image, are placed. The motion of each unit is determined by a geometry processor along with the motion of object images. The geometry processor sequentially writes, in a unit management table, coordinates of central points and vertices of each unit, the velocity of the central points, textures and color. A unit controller reads the location and velocity of each unit from the unit management table, calculates the distance and relative velocity between the units, and combines the units with or separates the units from each other according to the distance and relative velocity. The unit controller then writes the coordinates of the units in the unit management table. A rendering processor draws an object image including the units according to the information written in the unit management table.

20 Claims, 8 Drawing Sheets

| UNIT NUMBER | CENTRAL POINT/ COORDINATES OF VERTEX | VELOCITY OF CENTRAL POINT | ACTING FORCE | STATE OF COMBINATION | TEXTURE COORDINATES | COLOR |
|---|---|---|---|---|---|---|
| 1 | $(x1, y1, z1)\cdots$ | $(Vx1, Vy1, Vz1)$ | $(Fx1, Fy1, Fz1)$ | 2 | $(s1, t1)$ | $(R1, G1, B1)$ |
| 2 | $(x2, y2, z2)\cdots$ | $(Vx2, Vy2, Vz2)$ | $(Fx2, Fy2, Fz2)$ | 1、3 | $(s2, t2)$ | $(R2, G2, B2)$ |
| 3 | $(x3, y3, z3)\cdots$ | $(Vx3, Vy3, Vz3)$ | $(Fx3, Fy3, Fz3)$ | 2、5 | $(s3, t3)$ | $(R3, G3, B3)$ |
| 4 | $(x4, y4, z4)\cdots$ | $(Vx4, Vy4, Vz4)$ | $(Fx4, Fy4, Fz4)$ |  | $(s4, t4)$ | $(R4, G4, B4)$ |
| 5 | $(x5, y5, z5)\cdots$ | $(Vx5, Vy5, Vz5)$ | $(Fx5, Fy5, Fz5)$ | 3 | $(s5, t5)$ | $(R5, G5, B5)$ |

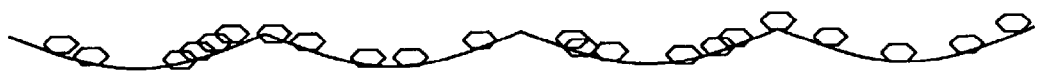
FIG. 8A
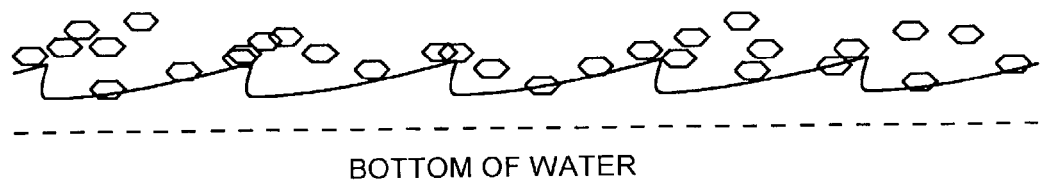
BOTTOM OF WATER
FIG. 8B
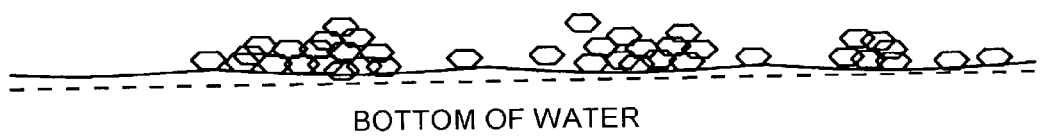
BOTTOM OF WATER
FIG. 8C
| WAVE CONDITION | BOUND TO WATER SURFACE | HOW UNIT IS DISPLAYED | RELATIVE VELOCITY BETWEEN UNITS | COMBINATION BETWEEN UNITS |
|---|---|---|---|---|
| HEIGHT < DEPTH | BOUND | TRANSPARENT | SMALL | EASY |
| HEIGHT = DEPTH | FREE | TRANSLUCENT | LARGE | HARD |
| HEIGHT = 0 | BOUND | TRANSLUCENT | SMALL | EASY |
FIG. 9

IMAGE PROCESSING SYSTEM, IMAGE PROCESSING METHOD, COMPUTER PROGRAM, RECORDING MEDIUM, AND SEMICONDUCTOR DEVICE

CROSS REFERENCE TO RELATED APPLICATIONS

The present application claims priority from Japanese Application Nos. 2001-306881 filed Oct. 2, 2001 and 2002-270146 filed Sep. 17, 2002, the disclosures of which are hereby incorporated by reference herein.

BACKGROUND OF THE INVENTION

The present invention relates to image processing for computer graphics (hereinafter, referred to as "CG"). More particularly, the present invention relates to image processing to simulate, as close as possible, the motion of a real object in an object image that changes with time.

The motion of object images (change in state, change in shape, movement) in computer graphics is modeled by solving the equation of motion for a plurality of points to determine the shape of the object image. The connection between points is completely responsible for interactions between these points.

For example, when the object image to be created is an image of a rigid body, the connection is as follows. The distance between points on the object image and the relative position of one point with respect to another do not easily change. On the other hand, when the object image to be created is an image of an elastic body, the connection is as follows. Points on the object image are joined by a segment. The object image consists of a series of segments, each of which is represented as a flexible member such as a spring constituting a model. The model moves in a range that satisfies the equation of motion for a spring.

Considering the connection between points as described above, it is possible to approximate the motion of CG object images to the motion of real objects to a certain degree.

However, modeling of some scenes such as those with waves on a sea surface often involves difficulties. The crest of the wave breaks and small water droplets scatter in the wind. Waterdrops fall to the sea surface, and run back to the sea. In such a case, it is necessary to separate small images of waterdrops from the image of waves (hereinafter, the small image is referred to as a "unit") or to combine units of water droplets with an image of a sea surface in order to vary the connection between the sea surface and the units. It is very troublesome to simulate this type of motion using the connection of points on an object image, as in conventional rigid or elastic bodies.

Further, conventional approaches can only separate and combine the units at the same location on a given object image even when the units are separated and combined repeatedly. Real-world objects, on the other hand, are not always separated or combined at the same locations. Therefore, it is difficult to simulate the real motion for such scenes.

A primary object of the present invention is to provide an image processing technique to make the motion of an object image much closer to the real thing.

SUMMARY OF THE INVENTION

In order to solve the above-mentioned problems, the present invention provides an image processing system, an image processing method, a computer program, a recording medium, and a semiconductor device.

An image processing system of the present invention includes an image processing unit operable to model at least a part of a moving object image using a plurality of units, the units being image components that are combinable with or separable from each other; a calculating unit operable to calculate a magnitude and a direction of a force acting on each of the units when the object image moves; and a unit controller operable to control each of the units modeled by the image processing unit according to the magnitude and the direction of the force acting on the unit.

Another image processing system of the present invention includes an image processing unit operable to create a base image representing a basic pose of a moving object image and to place at least one unit at a predetermined site on the base image to model the motion of the object image, the at least one unit being an image component that is combinable with or separable from the base image; a calculating unit operable to calculate a magnitude and a direction of a force acting on the at least one unit when the object image moves; and a unit controller operable to control the at least one unit according to the magnitude and the direction of the force acting on the at least one unit.

In image processing systems in which the image processing unit places a plurality of units at the predetermined site on the base image, the unit controller combines at least two of the units with or separates at least two of the units from each other according to a state of placement of the at least two units that varies according to the magnitude and the direction of the force acting on at least one of the at least two units. More specifically, the unit controller detects a change in the state of placement according to at least one of a relative position and a relative velocity of given points on the at least two units, combines the at least two units with each other when the change in the state of placement between the at least two units satisfies a predetermined combination factor, and separates the at least two units from each other when the change in the state of placement between the at least two units satisfies a predetermined separation factor. The image processing system also includes a table for recording information obtained as a result of calculation by the calculating unit. The information represents the magnitude and the direction of the force acting on the at least two units. The unit controller may be operable to combine the at least two units with or to separate the at least two units from each other according to the state of placement of the at least two units that varies according to the magnitude and the direction of the force acting on at least one of the at least two units as represented by the information recorded in the table, and to record in the table information representing that the at least two units are combined when the at least two units are combined with each other.

The state of placement may be, for example, the condition the units are in at a predetermined display location, including the location or the velocity of movement of a unit.

Another image processing system of the present invention includes an image processing unit operable to create a base image representing a basic pose of a moving object image and to place at least two units at a predetermined site on the base image to model the motion of the object image, the at least two units being image components that are combinable with or separable from the base image; a calculating unit operable to calculate at least one of a coordinate set and a velocity of a given point on each of the units when the object image moves; a recording unit operable to record information that represents at least one of the coordinate set and the velocity of the given point on each of the units; and a unit controller operable to derive at least one of a distance and a relative velocity between given points on the at least two units from the at least one of the coordinate set and the velocity of the given point on each of the units as represented by the information recorded in the recording unit, and, when the at least one of the derived distance and the derived relative velocity between the given points satisfies a predetermined combination factor, to combine the at least two units with each other, and, when the at least one of the derived distance and the derived relative velocity between the given points satisfies a predetermined separation factor, to separate the at least two units from each other.

The recording unit may record coordinate sets of points on the contour of each of the units. The unit controller may be operable so that, when the at least two units are combined with each other, the coordinate set of at least one point on the contour of one of the two units is identical with the coordinate set of at least one point on the contour of the other of the two units.

The unit controller may be operable to combine the predetermined site with or to separate the predetermined site from a unit according to at least one of the distance and the relative velocity between the predetermined site on the base image and the at least one unit. In addition, the base image may be a collection of units.

An image processing method of the present invention is to be performed in an apparatus which is adapted to model a moving object image using a plurality of units to produce the object image on a display. The units are image components that are combinable with or separable from each other. The method includes:
  (a) calculating a magnitude and a direction of a force acting on each of the units when the object image moves; and
  (b) controlling each of the units according to the magnitude and the direction of the force acting on the unit.

Another image processing method of the present invention is to be performed in an apparatus which is adapted to produce on a display a base image representing a basic pose of a moving object image and at least one unit. The at least one unit is an image component that is combinable with or separable from the base image. The method includes:
  (a) calculating a magnitude and a direction of a force acting on the at least one unit when the object image moves;
  (b) controlling the at least one unit according to the magnitude and the direction of the force acting on the at least one unit; and
  (c) creating the base image and placing the at least one unit at a predetermined site on the created base image according to the movement of both the at least one unit and the created base image.

Another image processing method of the present invention is to be performed in an apparatus which is adapted to produce on a display a base image representing a basic pose of a moving object image and at least two units. The at least two units are image components that are combinable with or separable from the base image. The method includes:
  (a) generating coordinate sets of points on the contour of each of the units when the object image moves, and information on at least one of a coordinate set and a velocity of a given point;
  (b) recording the generated coordinate sets of points on the contour of each of the units, and the information on at least one of the coordinate set and the velocity of the given point in a recording unit;
  (c) deriving at least one of a distance and a relative velocity between given points on the at least two units from the information on at least one of the coordinate set and the velocity of the given point on each of the units as represented by the information recorded on the recording unit, and, when the at least one of the derived distance and the derived relative velocity between the given points satisfies a predetermined combination factor, combining the at least two units with each other, and, when the at least one of the derived distance and the derived relative velocity between the given points satisfies a predetermined separation factor, separating the at least two units from each other;
  (d) when the at least two units are combined with each other, changing in the recording unit at least one coordinate set of points on the contour of each of the at least two units into an identical coordinate set of points; and
  (e) creating the base image and placing each of the at least two units at a predetermined site on the created base image according to the coordinate sets of points on the contour of each of the at least two units as recorded in the recording unit.

A semiconductor device according to the present invention is a semiconductor device adapted to be mounted in a computer for modeling a moving object image using a plurality of units to produce the object image on a display, the units being image components that are combinable with or separable from each other. The semiconductor device establishes in the computer, in cooperation with other components in the computer, an image processing system, the image processing system including a calculating unit operable to calculate a magnitude and a direction of a force acting on each of the units when the object image moves; and a unit controller operable to control each of the units according to the magnitude and the direction of the force acting on the unit, and to place each of the units at a predetermined site on a base image.

Another semiconductor device of the present invention is a semiconductor device adapted to be mounted in a computer for producing on a display a base image representing a basic pose of a moving object image and at least one unit, the at least one unit being an image component that is combinable with or separable from the base image. The semiconductor device establishes in the computer, in cooperation with other components in the computer, an image processing system, the image processing system including a calculating unit operable to calculate a magnitude and a direction of a force acting on the at least one unit when the object image moves; and a unit controller operable to control the at least one unit according to the magnitude and the direction of the force acting on the at least one unit, and to place the at least one unit at a predetermined site on the base image.

Another semiconductor device according to the present invention is a semiconductor device adapted to be mounted in a computer for producing on a display a base image representing a basic pose of a moving object image and at least two units, the at least two units being image components that are combinable with or separable from the base image. The semiconductor device establishes in the computer, in cooperation with other components in the computer, an image processing system, the image processing system including a calculating unit operable to calculate coordinate sets of points on the contour of each of the units when the object image moves, and at least one of a coordinate set and a velocity of a given point; a recording unit operable to record the coordinate sets of points on the contour of each of the units, and information representing the at least one of the coordinate set and the velocity of the given point; and a unit controller operable to derive at least one of a distance and a relative velocity between given points on the at least two units from the at least one of the coordinate set and the velocity of the given point on each of the units as represented by the information recorded in the recording unit, to combine the at least two units with each other when the at least one of the derived distance and the derived relative velocity between the given points satisfies a predetermined combination factor, and to separate the at least two units from each other when the at least one of the derived distance and the derived relative velocity between the given points satisfies a predetermined separation factor.

A computer program of the present invention may be recorded on, for example, a computer-readable recording medium. This computer program is for modeling a moving object image using a plurality of units to produce the object image on a display, the units being image components that are combinable with or separable from each other. The computer program includes:

(a) calculating a magnitude and a direction of a force acting on each of the units when the object image moves; and
(b) controlling each of the units according to the magnitude and the direction of the force acting on the unit.

Another computer program of the present invention may be recorded on, for example, a computer-readable recording medium. This computer program is for producing on a display a base image representing a basic pose of a moving object image and at least one unit. The at least one unit is an image component that is combinable with or separable from the base image. The computer program includes:

(a) calculating a magnitude and a direction of a force acting on the at least one unit when the object image moves;
(b) controlling the at least one unit according to the magnitude and the direction of the force acting on the at least one unit; and
(c) creating the base image and placing the at least one unit at a predetermined site on the created base image according to the movement of both the at least one unit and the created base image.

Another computer program of the present invention may be recorded on, for example, a computer-readable recording medium. This computer program is for producing on a display a base image for a moving object image and at least two units. The at least two units are image components that are combinable with or separable from the base image. The computer program includes:

(a) deriving coordinate sets of points on the contour of each of the units when the object image moves, and at least one of a coordinate set and a velocity of a given point;
(b) recording the derived coordinate sets of points on the contour of each of the units, and information representing the at least one of the coordinate set and the velocity of the given point in a recording unit;
(c) deriving at least one of a distance and a relative velocity between given points on the at least two units from the at least one of the coordinate set and the velocity of the given point on each of the units as represented by the information recorded in the recording unit, and, when the at least one of the derived distance and the derived relative velocity between the given points satisfies a predetermined combination factor, combining the at least two units with each other, and, when the at least one of the derived distance and the derived relative velocity between the given points satisfies a predetermined separation factor, separating the at least two units from each other, and, when the at least two units are combined with each other, changing in the recording unit at least one coordinate set of points on the contour of each of the at least two units into an identical coordinate set of points; and (d) creating the base image and placing each of the at least two units at a predetermined site on the created base image according to the coordinate sets of points on the contour of each of the at least two units as recorded in the recording unit.

BRIEF DESCRIPTION OF THE DRAWINGS

FIG. 8A is a view illustrating an image of waves that are generated using a trochoid curve;

FIG. 8B is a view illustrating an image of waves in which crests are breaking into spindrift;

FIG. 8C is a view illustrating an example of waveforms when the wave height is zero; and FIG. 9 is a table indicating the relation between the condition of waves and the state of corresponding units.

DETAILED DESCRIPTION

The present invention is described below using an embodiment thereof as an example. In this embodiment, the present invention is applied to an image processing system that creates object images modeling how an object is partially combined with another object or how an object is separated into multiple pieces. The image processing system of this embodiment models at least a part of a single object image as a collection of a plurality of units. It combines or separates the units by means of comparing the state of placement of the units with predetermined conditions.

Such image processing systems are implemented by cooperation of an information processing device, such as a computer, that comprises a display, an input device, a hard disk, and a disk drive, and a computer program or programs that a central processing unit (CPU), as an example of a semiconductor device included in the information processing device, can read. The computer programs may be those distributed on recording media such as CD-ROMs or DVD-ROMs and installed onto a hard disk through a disk drive when the system is established. Alternatively, the computer programs may be those downloaded directly onto a hard disk via a network.

Figure 1:
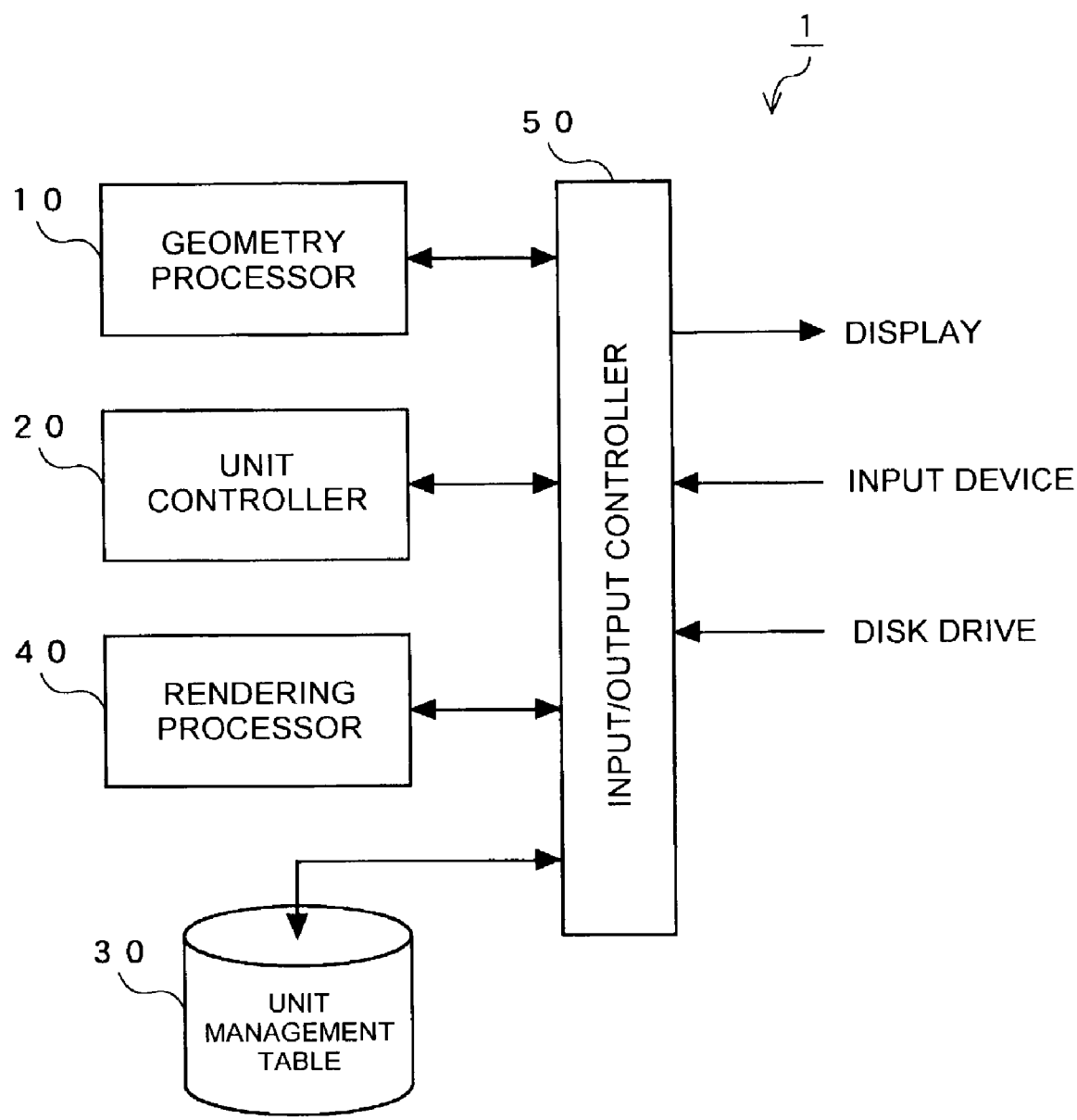
FIG. 1 is a functional block diagram of an image processing system of the present invention.

FIG. 1 shows an example of a functional block contained in an image processing system 1, that is, a functional block to be formed in information processing systems when a computer program is executed.

The image processing system 1 comprises the following functional blocks: a geometry processor 10 having a calculation capability, a unit controller 20 that performs control operations associated with units, a unit management table 30, a rendering processor 40 having an image processing capability, and an input/output controller 50 that controls input/output relative to a display, a hard disk, or a disk.

The geometry processor 10 carries out various calculation processing, such as moving coordinates, coordinate transformation, or perspective transformation, to determine the location or the shape of all object images. Such calculation processing is called geometry processing. The shape and behavior of an object image is determined through execution of geometry processing. When an object image contains a unit as at least a part thereof, the geometry processing also derives information associated with the unit, such as coordinates of each site on the unit, acting force, velocity, coordinates of a mapped texture (texture coordinates), and color.

The unit controller 20 controls the location and behavior of each unit according to, for example, the magnitude and direction of the force acting on a given point, such as the central point on each unit derived by the geometry processor 10. For example, the unit controller 20 derives the distance and relative velocity between the central points of two units from the coordinates and velocities of the central points of these units. The unit controller 20 then determines whether the distance and relative velocity between the central points satisfy predetermined criteria. The predetermined criteria may be a combination factor and a separation factor. When the distance and relative velocity between the central points of two units satisfy the combination factor, the two units are combined with each other. At least one coordinate set of a vertex on one unit is changed so that it becomes identical with at least one coordinate set of a vertex on the other unit. In other words, at least one vertex of each unit has the identical coordinates. Such an "overlapped" vertex is herein referred to as a shared point. On the other hand, when the distance or relative velocity between the central points satisfies the separation factor, the two units are separated from each other. When two units are separated, vertex sharing is terminated.

The unit management table 30 is a table that is formed in a memory on a hard disk or elsewhere. The unit management table 30 records various information relating to units which is derived as a result of the geometry processing by the geometry processor 10. In addition, the unit controller 20 records the information associated with the location of the units in the unit management table 30. The information may be updated along with, for example, the update of an image on a display.

Figure 2:
FIG. 2 is a view illustrating an example of a unit management table according to an embodiment of the present invention.

FIG. 2 is a view illustrating an example of the contents of the unit management table 30. In this embodiment, information relating to all units to be used for image formation is recorded for each unit identification number. The information includes, for example, coordinates of central points and vertices, the velocity of central points, the force acting on units, coordinates of textures to be drawn on units (texture coordinates), and unit colors.

For units that are combined by the unit controller 20, the unit number of a unit to be combined with a given unit as well as the coordinates of a shared point or points between these units are recorded. The unit number of the unit to be combined with is recorded in the entry for the state of combination. The coordinates of the shared point are recorded by means of, for example, changing the coordinates of the vertex serving as the shared point.

The rendering processor 40 draws in a frame memory (not shown) a base image and a plurality of images of units. The base image represents the basic pose of an object image. The images of the units are placed at a predetermined site on the base image so that they can be combined with or separated from each other. It is noted that a part or all of the base image may be generated using the units.

Each unit is drawn according to the information written in the unit management table 30. More specifically, a relevant unit is placed or moved according to the vertex coordinates recorded in the unit management table 30. Then, a texture is drawn according to the texture coordinates and is produced with a designated color.

For object images containing no units, the rendering processor 40 draws images by using only the results of geometry processing associated with the images.

These images are read out from the frame memory when necessary, and are produced on a display through the input/output controller 50. In this way, moving object images are produced on the display.

<Unit Control>

Unit control processing to be performed by the unit controller 20, that is, details of the processing to combine and separate a plurality of units that move relative to each other, is described below.

Factors for determining whether a given unit is to be combined with another unit or whether combined units are separated from each other may be the distance between the units, the relative velocity between the units, or a combination thereof. Where the distance between the units is used as a factor, two units are combined with each other when the distance between these units is smaller than a predetermined distance (hereinafter, referred to as a "distance constant"). When the two units are away from each other by at least the distance constant, the units are separated from each other. Where the relative velocity between two units is used as a factor, the units are combined with each other when the magnitude of the relative velocity between these units is smaller than a predetermined velocity (hereinafter, referred to as a "velocity constant"). When the relative velocity reaches or exceeds the predetermined velocity, the units are separated from each other. Where both the distance and the relative velocity are used as factors, the two units are combined with each other when these units are closer than the distance constant and when the magnitude of the relative velocity between the units is smaller than the velocity constant. The units are separated from each other when one of the factors is not satisfied.

The factors such as the distance constant or velocity constant to determine the combination or separation of the units may be varied depending on whether the two units to be combined with or separated from each other are combined in the immediately previous image.

Figure 3A:
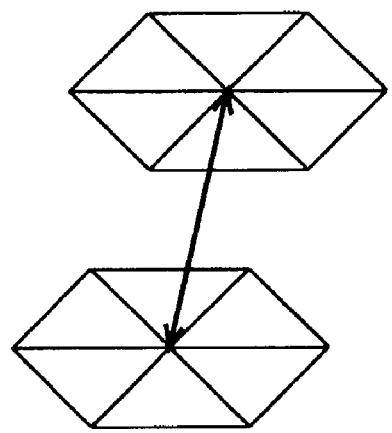
FIG. 3A is a view illustrating the distance between units.
Figure 3B:
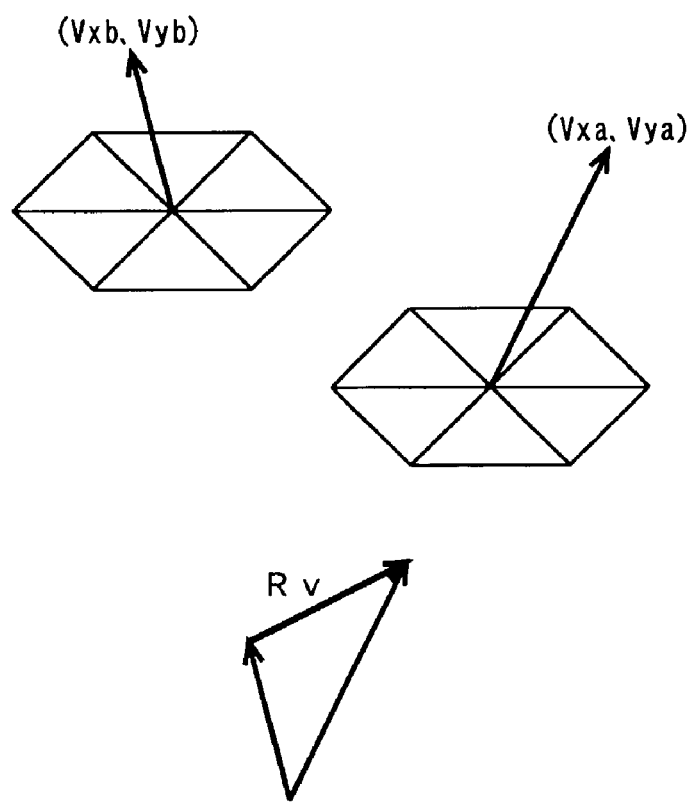
FIG. 3B is a view illustrating the relative velocity between units.

The distance and relative velocity between units as used in this embodiment are described conceptually with reference to FIG. 3.

Each unit shown in FIG. 3 is the minimum unit constituting an object image. The unit is a 3D figure which is hexagonal from a certain perspective. However, the shape of units is not specifically limited. The units may have other 3D shapes, or may be a 2D figure such as a rectangle.

The distance between two units may be expressed by, for example, the distance between the central points of the units. In the example shown in FIG. 3A, let the coordinates of the central points be (Xa, Ya, Za) and (Xb, Yb, Zb), the distance D between the units can be given by the following equation:

$$D=\sqrt{((Xa-Xb)^2+(Ya-Yb)^2+(Za-Zb)^2)}.$$

The distance between the closest vertices may also be used as the distance between units.

The relative velocity between units may be expressed by, for example, the relative velocity between the central points when these units move relative to each other. In the example shown in FIG. 3B, if the velocities of the central points are (Vxa, Vya, Vza) and (Vxb, Vyb, Vzb), the relative velocity Rv between the units can be given by the following equation:

$$Rv=(Vxa-Vxb, Vya-Vyb, Vza-Vzb).$$

The relative velocity between the closest vertices may also be used as the relative velocity between the units.

The magnitude |Rv| of the relative velocity Rv can be given by the following equation:

$$|Rv|=\sqrt{((Vxa-Vxb)^2+(Vya-Vyb)^2+(Vza-Vzb)^2)}.$$

When the above-mentioned distance D between the units and the magnitude |Rv| of the relative velocity between the units are equal to or smaller than the distance constant and the velocity constant, and when the units are combined with each other, one or two vertices of the two units are shared by these units as shown in FIG. 4. FIG. 4A shows an example where the units are combined with each other through a single shared point. FIG. 4B shows an example where the units are combined with each other through two shared points. The number of shared points is determined depending on where the units are brought into contact with each other.

Figure 4A:
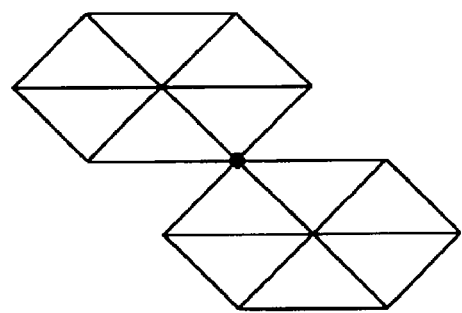
FIG. 4A shows two units that are combined with each other through a single shared point.
Figure 4B:
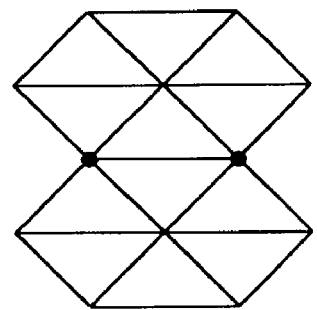
FIG. 4B shows two units that are combined with each other through two shared points.
Figure 4C:
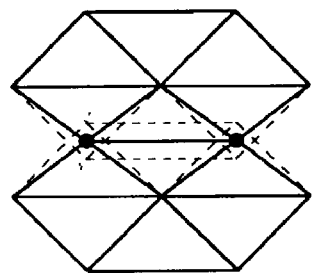
FIG. 4C shows two units that are overlapped with each other for combination.

FIG. 4C shows an example where two units are overlapped with each other for combination. In such a case, the midpoints between the vertices of the two units serve as the shared points. The contour of the unit a part of which is depicted by a broken line changes into the contour depicted by the solid line to match the shared points.

Figure 4D:
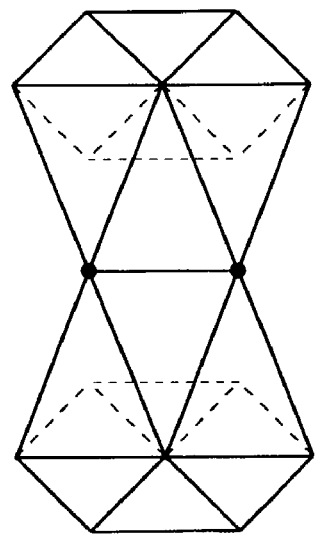
FIG. 4D shows two units that are away from but still combined with each other.

FIG. 4D is an example where two units are away from but still combined with each other. In such a case, the midpoints between the vertices of the two units serve as the shared points. As in the FIG. 4C, the contour of the unit a part of which is depicted by a broken line changes into the contour depicted by the solid line to match the shared points.

While there are two shared points in FIGS. 4C and 4D, there may be a single shared point. In such a case, the midpoint between the vertices may also be used as the shared point.

The units behave independently without being affected by other units when they exist alone. On the other hand, the behavior of the units affects that of other units when they are combined with each other.

FIG. 5 illustrates how a first unit is followed by a second unit combined with the first unit, when the first unit moves. Illustrated is an example where a spring is modeled using a plurality of units. FIG. 5A shows an example of two units A and B that are combined with each other through a single shared point. When an external force F is applied only to the unit A, the unit A moves as shown in FIG. 5B. The unit B deforms along with this movement. Segments between the vertices of the units are represented as a model of a spring. Therefore, the unit B moves with damped motion towards the shared point according to the equation of motion for a spring. This results in the state of combination as shown in FIG. 5C. In place of the example shown in FIG. 5B, both units A and B may be deformed along with the movement of the unit A, as shown in FIG. 5D. Then, the unit B moves with damped motion towards the shared point according to the equation of motion for a spring. This results in the state of combination as shown in FIG. 5C.

While FIG. 5 shows examples in which the external force F acts on the units A and B to separate them from each other, the units A and B also move with damped motion according to the external force F when the external force F acts on the units A and B to make them closer.

The combination or separation of the units is performed at a predetermined interval, such as every time a frame image is created. For example, the location and velocity of each unit is determined along with the location and velocity of an object image when geometry processing is performed on the object image including the units. Whether a certain unit is combined with or separated from another unit is determined according to the location and velocity of the units. This controls the motion of the units, producing an image where a unit is separated from or combined with an object image.

<Image Processing Procedure>

Figure 6:
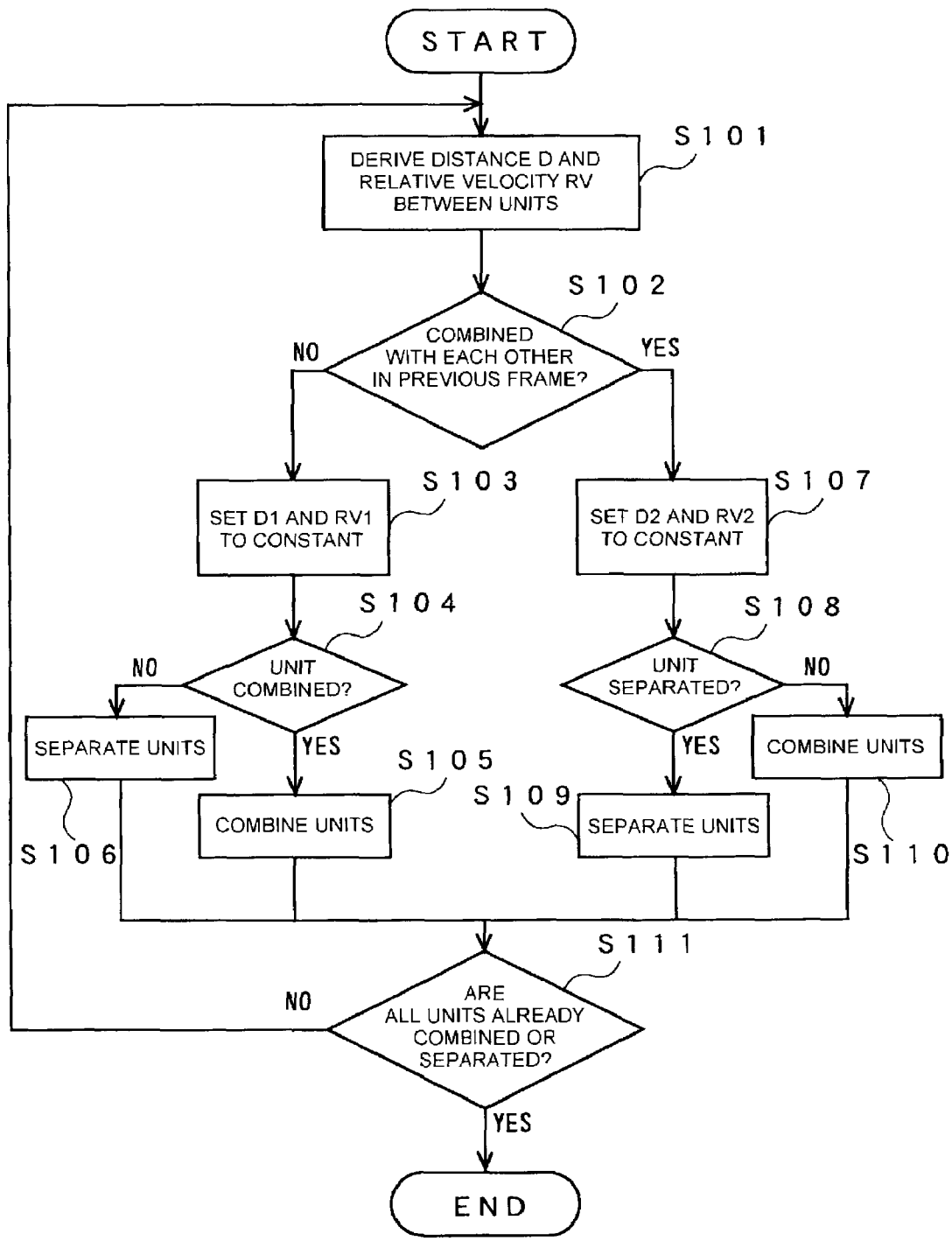
FIG. 6 is a flow chart illustrating a process in which units are combined with or separated from each other.

Next, procedures of the image processing performed by the image processing system 1 having the above-mentioned configuration are described with reference to FIG. 6. The processing is performed whenever a frame image is produced on a display.

It is assumed that the unit management table 30 contains information such as the coordinates of the central points and vertices of all units to be used, the velocity of the central points, and the force acting on the units, which are the results of geometry processing performed by the geometry processor 10, as well as information associated with the state of combination of each unit in the immediately previous frame image.

The unit controller 20 reads information relating to the two units that are subjected to a determination as to whether they are combined or separated from the unit management table 30 in which results of the geometry processing are written. The unit controller 20 then derives the distance D between the two units and the magnitude |Rv| of the relative velocity of the units by means of, for example, calculation (step S101).

Next, the unit controller 20 determines whether the two units were combined with each other in the immediately previous frame image (step S102). This can be determined from, for example, the state of combination of each unit that is written in the unit management table 30. When the units were not combined with each other in the immediately previous frame image, a distance constant D1 and a velocity constant Rv1 for non-combined states are set as the distance constant and the velocity constant, respectively (step S102: NO, step S103). When the units were combined with each other in the immediately previous frame image, a distance constant D2 and a velocity constant Rv2 for combined states are set as the distance constant and the velocity constant, respectively (step S102: YES, step S107).

When the distance constant D1 and the velocity constant Rv1 for the non-combined states are set as the distance constant and the velocity constant, respectively (step S103), the unit controller 20 performs the following processing.

First, it is determined whether the two units are to be combined with each other according to the distance D and the magnitude |Rv| of the relative velocity that are derived in step S101 (step S104). More specifically, the derived distance D is compared with the distance constant D1 to determine the magnitude relationship between them. In addition, the magnitude |Rv| of the derived relative velocity is compared with the velocity constant Rv1 to determine the magnitude relationship between them. From these comparison results, it is determined whether the two units are to be combined with each other in the subject frame.

For example, when the distance D is smaller than the distance constant D1 and the magnitude |Rv| of the relative velocity is smaller than the velocity constant Rv1, it is determined that the two units are to be combined with each other (step S104: YES). When one of the factors is not satisfied, it is determined that the two units are not to be combined with each other (step S104: No). When it is determined that the two units are to be combined with each other, the two units are combined (step S105). How they are combined is described below. When it is determined that the two units are not to be combined with each other, the units are kept separated and the process goes to step S111 (step S106).

When the distance constant D2 and the velocity constant Rv2 for the combined states are set as the distance constant and the velocity constant (step S107), the unit controller 20 performs the following processing.

First, it is determined whether the two units are to be separated from each other from the distance D and the relative velocity |Rv| that are derived in step S101 (step S108). More specifically, the derived distance D is compared with the distance constant D2 to determine the magnitude relationship between them. In addition, the magnitude |Rv| of the derived relative velocity and the velocity constant Rv2 are compared with each other to determine the magnitude relationship between them. From these comparison results, it is determined whether the two units are to be separated from each other in the subject frame.

For example, when the distance D is larger than the distance constant D2, or when the magnitude |Rv| of the relative velocity is larger than the velocity constant Rv2, it is determined that the two units are to be separated from each other (step S108: YES). When neither factor is satisfied, it is determined that the two units are not to be separated from each other (step S108: No).

When it is determined that the two units are to be separated from each other, the units are separated (step S109). More specifically, the relevant unit number is deleted from the corresponding item in the state of combination recorded in the unit management table 30.

When it is determined that the two units are not to be separated from each other, the units are kept combined and the process goes to step S111 (step S110). In such a case, similar operations are performed to those described in conjunction with step S105 to determine a new shared point.

When the units are combined or separated, it is confirmed whether the processing to combine or separate the units has been completed for all pairs of units. Thus, the processing to combine or separate the units is made for all pairs of the units. When the processing is completed, the processing in the current frame image is terminated (step S111: YES). On the other hand, when the processing has not been completed, similar processing is performed on other pairs of the units (step S111: NO).

When the unit controller 20 finishes the processing to combine or separate the units, the rendering processor 40 draws each unit in a predetermined frame buffer based on the information written in the unit management table 30. This completes the generation of an image for a single frame. Successive generation of images for single frames results in a motion picture in which the units are combined with or separated from each other. Motion of the units is added to the motion of the object image obtained through the geometry processing by combining or separating the units. This makes it possible to simulate the motion of an object much closer to the motion of a real object.

Next, how the units are combined in steps S105 and S10 is described in detail.

Figure 7:
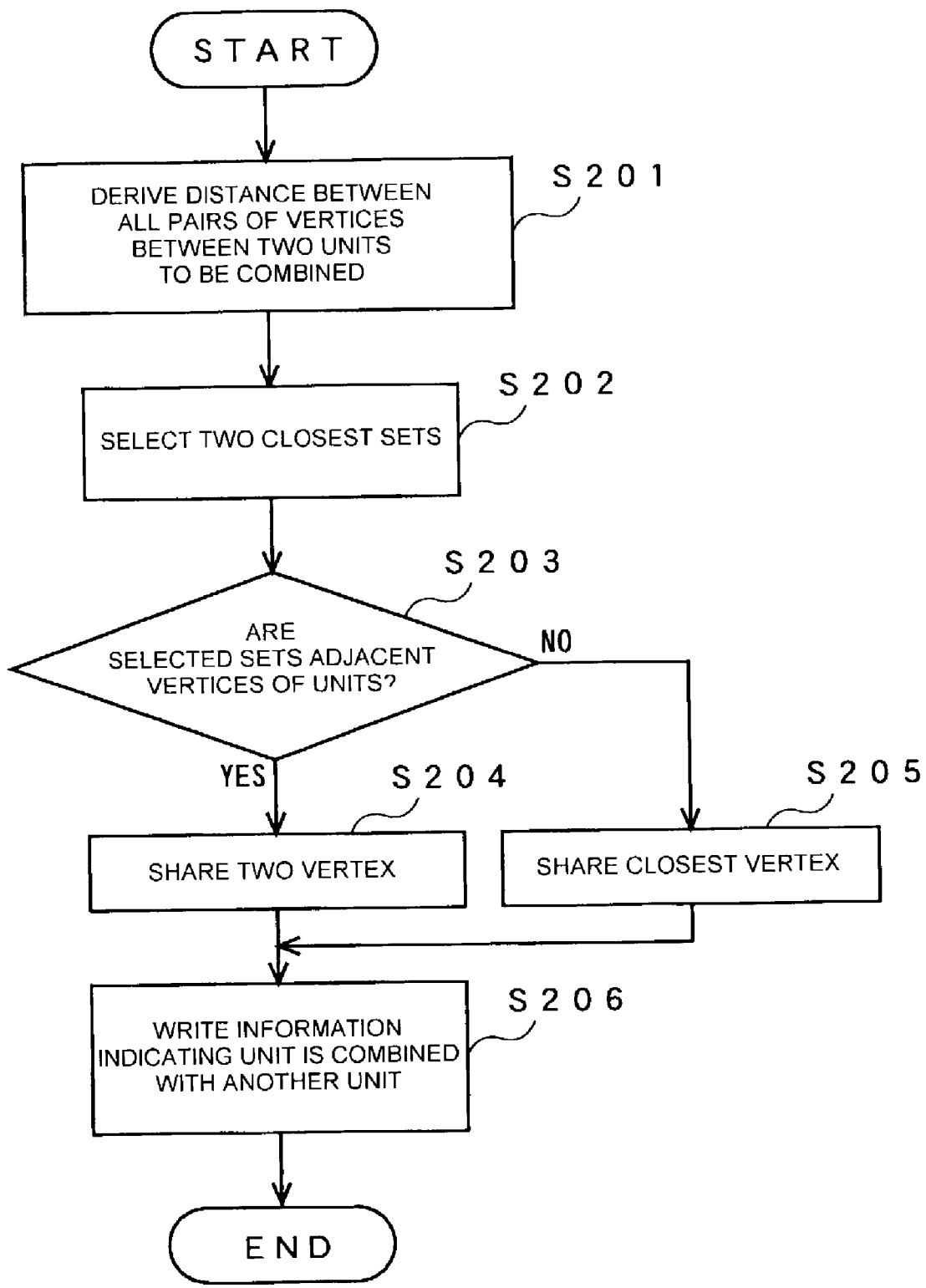
FIG. 7 is a flow chart illustrating a process for determining a shared point according to this embodiment.

FIG. 7 is a flow chart illustrating a process for determining a shared point when units are combined with each other. The unit controller 20 performs the following processing to combine two units when it is determined that these units are to be combined.

First, the unit controller 20 reads the coordinates of all vertices on the two units to be combined with each other from the unit management table 30. The unit controller 20 then derives, through calculations, the distance between two vertices for all pairs of the vertices (step S201). Next, the two sets of vertices that are closest to each other are selected from the distances between the vertices (step S202). The unit controller 20 then determines whether the selected sets of vertices are vertices that are adjacent to each other in the units (step S203).

When the vertices are adjacent, the selected sets of two vertices are defined as the shared points (step S203: YES, step S204). When they are not adjacent vertices, the vertices that are closest to each other are used as the shared points (step S203: NO, step S205).

The shared points are determined in a different manner depending on whether the two units to be combined were already combined in the previous frame. When the units were not combined in the previous frame, the shared point is determined from the relationship between the vertices to be used as the shared point(s). More specifically, as shown in FIG. 4, when the vertices to be used as the shared points are in contact with each other, the contact points (FIGS. 4A and 4B) are used as the shared points. On the other hand, when the units are overlapped with or away from each other, the midpoints between the closest vertices (FIGS. 4C and 4D) are used as the shared points.

Figure 5A:
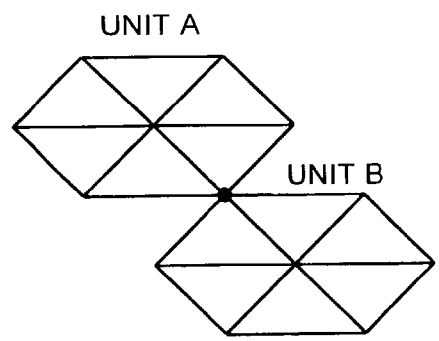
FIG. 5A shows an example of two units A and B that are combined with each other through a single shared point.
Figure 5B:
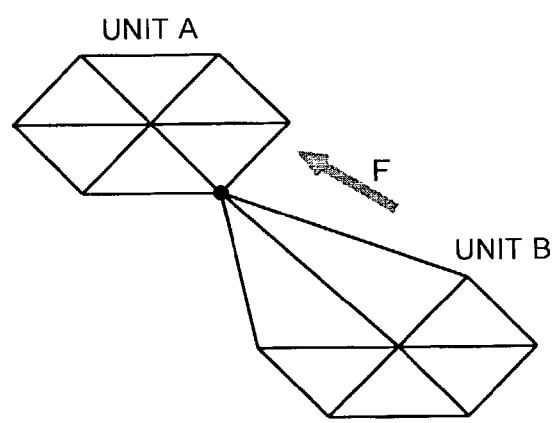
FIG. 5B shows an example where an external force F is applied only to the unit A.
Figure 5C:
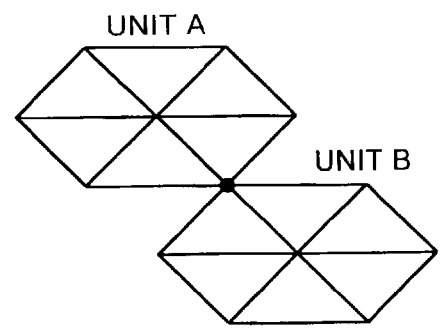
FIG. 5C shows an example where the unit B moves towards the shared point according to the equation of motion for a spring and then combined with the unit A.
Figure 5D:
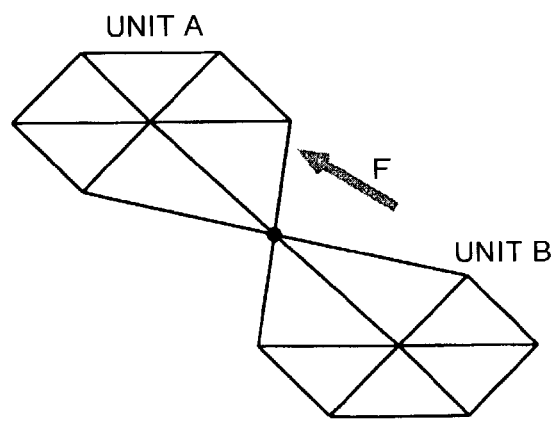
FIG. 5D shows another example where an external force F is applied only to the unit A.

When the units were combined in the previous frame, a vertex of one unit is shared with the other unit by means of fixing the shape of one unit while deforming the other unit. More specifically, as shown in FIG. 5B, the shape of the unit A is fixed and only the unit B is deformed to share the associated vertices of the units A and B between these two units. Alternatively, as shown in FIG. 5D, the shapes of both units may be deformed and predetermined points between the units may be shared.

When the shared point is determined, the value of the coordinates of the shared point and the unit numbers of the combined units are written in the unit management table 30 (step S206).

Object images can be modeled in various ways, depending on how the units are combined, in particular, on how a shared point is determined.

When the units were not combined in the previous frame, adhesion of units can be modeled as an image. For example, a unit is placed on the surface of water, and other units representing waterdrops fall to the unit representing the water surface, an image that simulates a scene where a waterdrop falls and adheres to the surface of water by surface tension. When the units were combined in the previous frame, a scene where sticky units are separated from each other can be modeled as an image. For example, when two units are combined with the surface of water, and one unit is separated from the other unit due to an external force, an image may simulate deformation of the other unit as a result of movement of the one unit. Consequently, it becomes possible to simulate a scene with falling droplets more realistically than ever.

In this way, the object images can be rendered more realistically than with conventional techniques for objects such as liquids whose state of combination is varied.

Next, an example of image processing performed by the image processing system 1 of the present invention is described. A scene where droplets and bubbles scatter in the wind over crests of seawater curling over and plunging downward is used as an example of simulation. Conventional approaches can also simulate waves on the water surface in a somewhat realistic manner, but it was difficult to simulate more realistic images with, for example, plunging crests of waves and droplets scattering in the wind. Image processing according to the present invention places a plurality of units on the water surface and controls the textures and colors of the units in various ways. In addition, the units are separated from and combined with the water surface depending on the force acting on the surface. The motion of the sea waves can be simulated using a more realistic and easier approach. An image processing method to be used for this purpose is described specifically below.

The motion of waves on the water can generally be classified into the following three patterns: where the water depth is very much larger than the wave height (FIG. 8A), where the water depth is approximately equal to the wave height (FIG. 8B), and in shallow water, where the wave height is around zero (FIG. 8C).

FIG. 9 is a table indicating the relationship between the condition of waves and the state of corresponding units. These relationships are reflected in the unit management table 30.

It is well known in the field of computer graphics that the motion of waves can be approximated using a trochoid curve when water depth is very much larger than wave height. In this example, the coordinates of the water surface are derived by approximating the motion of waves using a trochoid curve to create an image that simulates such water surface. Alternatively, the motion of waves may be obtained using the equation of motion for points in the water.

Each unit represents a waterdrop. External forces, such as gravity acting on the droplets, water surface tension, and buoyancy, are derived through calculation. Each unit is bound to the water surface due to the derived external forces. The units are displayed as floating over the water surface. The unit is transparent in order to avoid unnatural disturbance over the water surface. Since the units are bound to the water surface, they move at the same velocity as a point on the water surface. Each unit behaves in a similar manner to each other on or over the water surface. The relative velocity between the units is relatively small. Likewise, the relative velocity between each unit and the water surface is also small. Accordingly, the units can easily be combined with each other.

In order to provide the above-mentioned images, the image processing system 1 performs the following processing.

The shape and motion of the water surface (waves) are determined by the geometry processor 10 by means of calculating an approximate expression of the trochoid curve or calculating the equation of motion. This automatically determines the motion of each unit on and over the water surface. The geometry processor 10 sequentially writes information such as the coordinates of the central points and vertices, the velocity of the central points, texture, and color, which are obtained as a result of the calculation, into the unit management table 30.

When the geometry processing is completed, the unit controller 20 reads, from the unit management table 30, the information relating to the units, such as a location or velocity that is specified by the coordinates. The unit controller 20 then calculates the distance and magnitude of the relative velocity between the units to determine whether the units are to be combined with or separated from each other in the manner described above. When the units are combined with each other, the coordinates of a shared point are derived. The derived coordinates of the shared point are written into the unit management table 30 as necessary. This processing is performed for all pairs of units. After the completion of the above-mentioned processing, the rendering processor 40 draws the units according to the information relating to the units written in the unit management table 30. The image as shown in FIG. 8A can be produced on a display by the drawn data.

When the water depth is approximately equal to the wave height, the crests of waves break and water drops scatter in the wind in the real sea. This is because droplets over the broken waves behave uniquely. Under this circumstance, the force of water tossing up the spray exceeds the external forces, such as gravity, water surface tension and buoyancy, that bind the droplets to the water surface. Since external forces such as gravity and the force of wind are acting on the spattered droplets, the droplets receiving the external force behave appropriately. The unit turns from transparent to translucent. The droplets then fall to the water surface and eventually foam covers the water surface.

The image processing system 1 performs the following processing. The geometry processor 10 calculates the motion of the water surface, the gravity acting on each unit, water surface tension, the force binding the units to the water surface by buoyancy, and other external forces. The coordinates of the central points and vertices of each unit, the velocity of the central points, and information on whether the units are away from the water surface, which are obtained as a result of the calculation, are written into the unit management table 30 as necessary. Whether units are away from the water surface can be determined according to the external forces acting on the water surface, as well as the forces acting on the units and the magnitude thereof. After the completion of such processing, the unit controller 20 derives the distance and magnitude of the relative velocity between the units. According to the distance and magnitude of the relative velocity, the units are combined with or separated from each other. The coordinates of the units at that time are written in the unit management table 30.

When the water depth is approximately equal to the wave height, as shown in FIG. 9, the units are free from binding to the water surface. Therefore, the relative velocity between the units is increased. It becomes difficult to keep the units combined. In particular, the units over the broken crests of waves are thrown away from the water surface because the force tossing the units up exceeds the binding force. The units are separated from the crests of waves accordingly. The separated units are subjected to the force of gravity and to other external forces such as the force of wind. Therefore, the units are controlled to exhibit behavior determined by the relative value between the force of gravity and the external forces. When the units fall to the water surface, they are bound to the water surface. The unit controller 20 writes such a series of behavioral conditions and coordinates in the unit management table 30 sequentially.

The rendering processor 40 sequentially reads the information relating to the units written in the unit management table 30 to draw the units. For the units that are separated from the crests of waves, textures representing droplets of water are drawn. The units corresponding to the droplets turn translucent. For the units falling to the water surface, textures representing foam are drawn. The units corresponding to the foam are kept translucent for awhile. Then, the translucent units turn transparent. As shown in FIG. 8B, the crests of waves collapse, and droplets of water scatter in the wind. Then, the droplets fall to the water surface. Foam covers the face of the wave, and it eventually disappears. In this way, it is possible to simulate the motion in the sea using images which are as realistic as possible.

With shallow water waves having a height of approximately zero, bubbles cover the water and part of the wave line moves slowly in a predetermined direction. The units representing the droplets created after the crests of waves break fall to the water surface while being subjected to external forces such as gravity or the force of wind. The units are then bound to the surface of the water by external forces, such as gravity, surface tension and buoyancy. In order to simulate bubbles, textures representing bubbles are drawn into the units. The units turn translucent. The processing performed by the image processing system 1 to provide such images is generally identical to the processing in the case where the water depth is very much larger than the wave height.

A cycle of this processing makes it possible to simulate more realistically waves traveling from offshore and rushing shoreward.

The above example represents the case where the units are combined with or separated from the water surface according to the external forces acting on the units. However, the present invention is not limited thereto. The units may be combined with or separated from each other according to the distance and relative velocity between them. In such a case, for example, a point with which a unit is to be combined is provided on the water surface. The unit controller 20 may determine whether the unit is to be combined with or separated from the water surface according to the distance and relative velocity between that point and the unit.

In this example, droplets and bubbles over rippling water are simulated using units. However, the present invention is not limited to such simulation. Instead, the present invention can be applied to any applications to model or simulate images of objects, part of which are combined with or separated from each other. For example, a part of a robot formed of a plurality of components may be separated from the main body. The part may be combined with the body again later. Such a simulation can be made by using the components as the units, as in the description above. Combining or separating a part of a cartoon in entertainment image processing can also be achieved in a similar way.

The above description is applied to the case where all functional blocks 10 to 50 that are shown in FIG. 1 are implemented by the information processing device. However, the functional blocks 10 to 50 may be implemented by using a computer system having semiconductor devices other than the CPU, such as semiconductor devices with one or more processors for image processing and drive control means therefor. Alternatively, the functional blocks 10 to 50 may be implemented by cooperating the CPU with the above-mentioned semiconductor processor(s). In such a case, the computer program may be previously recorded in a memory on a semiconductor device. Alternatively, the computer program may be recorded in the memory later.

As apparent from the above, according to the present invention, details of movement of an object image to be produced can be modeled using units. This allows the entire object image to be simulated more closely to the motion of a real object.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An image processing system, comprising:
   an image processing unit operable to model at least a part of a moving object image using a plurality of units, the units being image components that are combinable with or separable from each other to form the modeled part of the moving object image;
   a calculating unit operable to calculate a magnitude and a direction of a force acting on each of the units when the object image moves; and
   a unit controller operable to change a shape of an individual one of the units of the modeled part according to the magnitude and the direction of the force acting on the individual unit.

2. An image processing system, comprising:
   an image processing unit operable to create a base image representing a basic pose of a moving object image and to place one or more individual units at a predetermined site on the base image to model the motion of the object image, each individual unit being an image component that is combinable with or separable from the base image to form the moving object image;
   a calculating unit operable to calculate a magnitude and a direction of a force acting on the one or more individual units when the object image moves; and
   a unit controller operable to change a shape of an individual one of the units according to the magnitude and the direction of the force acting on the individual unit.

3. The image processing system as claimed in claim 2, wherein the image processing unit is operable to place a plurality of units at the predetermined site on the base image to model the motion of the object image, the unit controller being operable to combine at least two of the units with or separate at least two of the units from each other according to a state of placement of the at least two units that varies according to the magnitude and the direction of the force acting on at least one of the at least two units.

4. The image processing system as claimed in claim 3, wherein the unit controller is operable to:
  detect a change in the state of placement according to at least one of a relative position and a relative velocity of given points on the at least two units;
  combine the at least two units with each other when the change in the state of placement between the at least two units satisfies a predetermined combination factor; and
  separate the at least two units from each other when the change in the state of placement between the at least two units satisfies a predetermined separation factor.

5. The image processing system as claimed in claim 3, further comprising a table for recording information obtained as a result of calculation by the calculating unit, the information representing the magnitude and the direction of the force acting on individual ones of the at least two units, wherein
  the unit controller is operable to combine the at least two units with or to separate the at least two units from each other according to the state of placement of the at least two units that varies according to the magnitude and the direction of the force acting on at least one of the at least two units as represented by the information recorded in the table, and to record in the table information representing that the at least two units are combined when the at least two units are combined with each other.

6. The image processing system as claimed in claim 2, wherein the unit controller is operable to combine the predetermined site with or to separate the predetermined site from the at least one unit according to at least one of a distance and a relative velocity between the predetermined site on the base image and the at least one unit.

7. The image processing system as claimed in claim 2, wherein the base image is a collection of units other than the one or more individual units.

8. An image processing system, comprising:
  an image processing unit operable to create a base image representing a basic pose of a moving object image and to place at least two units at a predetermined site on the base image to model the motion of the object image, the at least two units being image components that are combinable with or separable from the base image to form the moving object image;
  a calculating unit operable to calculate at least one of a coordinate set and a velocity of a given point on each of the units when the object image moves;
  a recording unit operable to record information that represents at least one of the coordinate set and the velocity of the given point on each of the units; and
  a unit controller operable to derive at least one of a distance and a relative velocity between given points on the at least two units from the at least one of the coordinate set and the velocity of the given point on each of the units as represented by the information recorded in the recording unit, and, when the at least one of the derived distance and the derived relative velocity between the given points satisfies a predetermined combination factor, to combine the at least two units with each other, and, when the at least one of the derived distance and the derived relative velocity between the given points satisfies a predetermined separation factor, to separate the at least two units from each other, and, when the at least two units are combined with each other and the at least one of the derived distance and the derived relative velocity changes but does not satisfy the predetermined separation factor, to change a shape of at least one individual unit of the at least two units.

9. The image processing system as claimed in claim 8, wherein the recording unit further records coordinate sets of points on the contour of each of the units,
  the unit controller being operable so that, when the at least two units are combined with each other, the coordinate set of at least one point on the contour of one of the two units is identical with the coordinate set of at least one point on the contour of the other of the two units.

10. The image processing system as claimed in claim 8, wherein the unit controller is operable to combine the predetermined site with or to separate the predetermined site from at least one of the two units according to at least one of a distance and a relative velocity between the predetermined site on the base image and the at least one unit.

11. The image processing system as claimed in claim 8, wherein the base image is a collection of units other than the at least two units.

12. An image processing method to be performed in an apparatus which is adapted to model a moving object image using a plurality of units to produce the object image on a display, the units being image components that are combinable with or separable from each other to form the moving object image, the method comprising:
  calculating a magnitude and a direction of a force acting on each of the units when the object image moves; and
  changing a shape of an individual one of the units according to the magnitude and the direction of the force acting on the individual unit.

13. An image processing method to be performed in an apparatus which is adapted to produce on a display a base image representing a basic pose of a moving object image and one or more individual units, each individual unit being an image component that is combinable with or separable from the base image to form the moving object image, the method comprising:
  calculating a magnitude and a direction of a force acting on the one or more individual units when the object image moves;
  changing a shape of an individual one of the units according to the magnitude and the direction of the force acting on the one or more individual units; and
  creating the base image and placing the one or more individual units at a predetermined site on the created base image according to the magnitude and direction of the force acting on both the one or more individual units and the created base image.

14. An image processing method to be performed in an apparatus which is adapted to produce on a display a base image representing a basic pose of a moving object image and at least two units, the at least two units being image components that are combinable with or separable from the base image to form the moving object image, the method comprising:
  generating coordinate sets of points on the contour of each of the units when the object image moves, and information on at least one of a coordinate set and a velocity of a given point;
  recording the generated coordinate sets of points on the contour of each of the units, and the information on at least one of the coordinate set and the velocity of the given point in a recording unit;

deriving at least one of a distance and a relative velocity between given points on the at least two units from the information on at least one of the coordinate set and the velocity of the given point on each of the units as represented by the information recorded in the recording unit, and, when the at least one of the derived distance and the derived relative velocity between the given points satisfies a predetermined combination factor, combining the at least two units with each other, and, when the at least one of the derived distance and the derived relative velocity between the given points satisfies a predetermined separation factor, separating the at least two units from each other, and, when the at least two units are combined with each other and the at least one of the derived distance and the derived relative velocity changes but does not satisfy the predetermined separation factor, changing a shape of at least one individual unit of the at least two units;

when the at least two units are combined with each other, changing in the recording unit at least one coordinate set of points on the contour of each of the at least two units into an identical coordinate set of points; and creating the base image and placing each of the at least two units at a predetermined site on the created base image according to the coordinate sets of points on the contour of each of the at least two units as recorded in the recording unit.

15. A semiconductor device adapted to be mounted in a computer for modeling a moving object image using a plurality of units to produce the object image on a display, the units being image components that are combinable with or separable from each other to form the moving object image, the semiconductor device establishing in the computer, in cooperation with other components in the computer, an image processing system, the image processing system comprising:

a calculating unit operable to calculate a magnitude and a direction of a force acting on each of the units when the object image moves; and a unit controller operable to change a shape of an individual one of the units of the moving object image according to the magnitude and the direction of the force acting on the individual unit, and to place each of the units at a predetermined site on a base image.

16. A semiconductor device adapted to be mounted in a computer for producing on a display a base image representing a basic pose of a moving object image and one or more individual units, the one or more individual units being an image component that is combinable with or separable from the base image to form the moving object image, the semiconductor device establishing in the computer, in cooperation with other components in the computer, an image processing system, the image processing system comprising:

a calculating unit operable to calculate a magnitude and a direction of a force acting on the one or more individual units when the object image moves; and a unit controller operable to change a shape of an individual one of the units according to the magnitude and the direction of the force acting on the one or more individual units, and to place the one or more individual units at one or more predetermined sites on the base image.

17. A semiconductor device adapted to be mounted in a computer for producing on a display a base image representing a basic pose of a moving object image and at least two units, the at least two units being image components that are combinable with or separable from the base image to form the moving object image, the semiconductor device establishing in the computer, in cooperation with other components in the computer, an image processing system, the image processing system comprising:

a calculating unit operable to calculate coordinate sets of points on the contour of each of the units when the object image moves, and at least one of a coordinate set and a velocity of a given point;

a recording unit operable to record the coordinate sets of points on the contour of each of the units, and information representing the at least one of the coordinate set and the velocity of the given point; and a unit controller operable to derive at least one of a distance and a relative velocity between given points on the at least two units from the at least one of the coordinate set and the velocity of the given point on each of the units as represented by the information recorded in the recording unit, to combine the at least two units with each other when the at least one of the derived distance and the derived relative velocity between the given points satisfies a predetermined combination factor, and to separate the at least two units from each other when the at least one of the derived distance and the derived relative velocity between the given points satisfies a predetermined separation factor, and, when the at least two units are combined with each other and the at least one of the derived distance and the derived relative velocity changes but does not satisfy the predetermined separation factor, to change a shape of at least one individual unit of the at least two units.

18. A recording medium having information recorded thereon for performing a method of modeling a moving object image using a plurality of units to produce the object image on a display, the units being image components that are combinable with or separable from each other to form the moving object image, the method comprising:

calculating a magnitude and a direction of a force acting on each of the units when the object image moves; and changing a shape of an individual one of the units according to the magnitude and the direction of the force acting on the individual unit.

19. A recording medium having information recorded thereon for performing a method of producing on a display a base image representing a basic pose of a moving object image and one or more individual units, each individual unit being an image component that is combinable with or separable from the base image to form the moving object image, the method comprising:

calculating a magnitude and a direction of a force acting on the one or more individual units when the object image moves;

changing a shape of an individual one of the units according to the magnitude and the direction of the force acting on the individual unit; and creating the base image and placing the one or more individual units at one or more predetermined sites on the created base image according to the magnitude and direction of the force acting on both the one or more individual units and the created base image.

20. A recording medium having information recorded thereon for performing a method of producing on a display a base image for a moving object image and at least two units, the at least two units being image components that are combinable with or separable from the base image to form the moving object image, the method comprising:

deriving coordinate sets of points on the contour of each of the units when the object image moves, and at least one of a coordinate set and a velocity of a given point;

recording the derived coordinate sets of points on the contour of each of the units, and information representing the at least one of the coordinate set and the velocity of the given point in a recording unit;

deriving at least one of a distance and a relative velocity between given points on the at least two units from the at least one of the coordinate set and the velocity of the given point on each of the units as represented by the information recorded in the recording unit, and, when the at least one of the derived distance and the derived relative velocity between the given points satisfies a predetermined combination factor, combining the at least two units with each other, and, when the at least one of the derived distance and the derived relative velocity between the given points satisfies a predetermined separation factor, separating the at least two units from each other, and, when the at least two units are combined with each other, changing in the recording unit at least one coordinate set of points on the contour of each of the at least two units into an identical coordinate set of points, and, when the at least two units are combined with each other and the at least one of the derived distance and the derived relative velocity changes but does not satisfy the predetermined separation factor, changing a shape of at least one individual unit of the at least two units; and creating the base image and placing each of the at least two units at a predetermined site on the created base image according to the coordinate sets of points on the contour of each of the at least two units as recorded in the recording unit.

* * * * *